(12) United States Patent
Lee et al.

(10) Patent No.: US 6,772,197 B1
(45) Date of Patent: Aug. 3, 2004

(54) APPARATUS FOR ENABLING COMMUNICATION BETWEEN A COMPUTER TERMINAL AND A SERVICING STATION FOR REMOTE, REAL-TIME, CONTROLLED REPAIR

(76) Inventors: Stephen J. Lee, No. 57, Tai-Li St., Tai-Shan Hsiang, Taipei Hsien (TW); Cluan S. Wu, No. 57, Tai Li St., Tai-Shan Hsiang, Taipei Hsien (TW); Thomas P. Lee, No. 57, Tai-Li St., Tai-Shan Hsiang, Taipei Hsien (TW)

( * ) Notice: Subject to any disclaimer, the term of this patent is extended or adjusted under 35 U.S.C. 154(b) by 723 days.

(21) Appl. No.: 09/662,226

(22) Filed: Sep. 14, 2000

(30) Foreign Application Priority Data

Jul. 17, 2000 (CN) .......................................... 00120273 A

(51) Int. Cl.[7] .............................................. G06F 13/00
(52) U.S. Cl. ....................................................... 709/208
(58) Field of Search ................................ 709/200, 204, 709/208, 219, 224

(56) References Cited

U.S. PATENT DOCUMENTS 5,913,920 A  *  6/1999  Adams et al. ............... 709/204

* cited by examiner

Primary Examiner—Robert B. Harrell
(74) Attorney, Agent, or Firm—Baker Botts L.L.P.

(57) ABSTRACT

In a method and apparatus for enabling communication between a computer terminal and a servicing station in a remote controlled system, after a communications link has been established between the computer terminal and the servicing station, video signals of the computer terminal are captured and are transmitted to the servicing station via the communications link so that images shown on the computer terminal can be shown by a display monitor of the servicing station. At the same time, input signals received from and generated by an input device of the servicing station are transmitted to the computer terminal via the communications link so as to enable remote control of the computer terminal via the servicing station.

27 Claims, 3 Drawing Sheets

APPARATUS FOR ENABLING COMMUNICATION BETWEEN A COMPUTER TERMINAL AND A SERVICING STATION FOR REMOTE, REAL-TIME, CONTROLLED REPAIR

BACKGROUND OF THE INVENTION

1. Field of the Invention

The invention relates to the servicing of a computer terminal, more particularly to a method and apparatus for enabling communication between a computer terminal and a servicing station in a remote controlled system.

2. Description of the Related Art

Computer users usually experience problems when installing new software with which they are unfamiliar. In some instances, the assistance of technical personnel is needed to complete the installation procedure. However, when computer users discuss their installation problems with technical personnel over the telephone, some difficulty is encountered because the technical personnel are unable to see the messages shown on the monitor or to operate the mouse or keyboard of the computer terminal. Thus, the technical personnel can only guess what the actual problem of the computer user is, and can only offer possible remedies to the problem. If the problem persists, the computer user has to send the computer terminal to the technical personnel for servicing. This results in significant inconvenience and unnecessary expense to the computer user, especially because most installation problems can be easily overcome by adjusting computer software and/or BIOS settings, or by upgrading the BIOS.

Software solutions for enabling remote control between computer terminals have been proposed heretofore to overcome the aforesaid drawbacks. An example of such computer software is pcAnywhere by Symantec Corp., which is a U.S.-based company. When the computer terminal of the user (hereinafter referred to as the user terminal) is installed with this software, the computer terminal of the technical personnel (hereinafter referred to as the "_servicing terminal_") installed with the same software can receive output signals from the user terminal via the public switched telephone network or the Internet, thereby enabling the technical personnel to monitor the operating state of the user terminal and to provide accurate advice for remedying the problem of the user. The user terminal can also receive input signals from the servicing terminal, thereby enabling the technical personnel to operate the user terminal and remedy the problem of the user.

It is noted that the software solution as described above requires both the user and servicing terminals to be compatible with each other and to be installed with the same software. In addition, the software solution is not possible in the event that the operating system of the user terminal is not working properly, such as when there are errors in the BIOS settings.

SUMMARY OF THE INVENTION

Therefore, the main object of the present invention is to provide a hardware solution for enabling real-time remote control between a computer terminal and a servicing station in a remote controlled system, wherein video signals from the computer terminal can be received by the servicing station, and input signals from the servicing station can be received by the computer terminal such that operation of the computer terminal can be controlled via the servicing station.

According to one aspect of the invention, a method for enabling communication between a computer terminal and a servicing station in a remote controlled system comprises:

establishing a communications link between the computer terminal and the servicing station;

capturing video signals of the computer terminal;

transmitting the video signals to the servicing station via the communications link so that images shown on the computer terminal can be shown by a display monitor of the servicing station; and transmitting input signals received from and generated by an input device of the servicing station to the computer terminal via the communications link so as to enable remote control of the computer terminal via the servicing station.

According to another aspect of the invention, an apparatus for enabling communication between a computer terminal and a servicing station in a remote controlled system comprises:

a first control device adapted to be connected to the computer terminal, the first control device including means for capturing video signals of the computer terminal, means for transmitting the video signals, and means for receiving input signals and for providing the input signals to the computer terminal; and a second control device adapted to be connected to the servicing station and capable of establishing a communications link with the first control device, the second control device including means for receiving the video signals transmitted by the first control device and for providing the video signals to the servicing station so that images shown on the computer terminal can be shown by the servicing station, and means for receiving the input signals from the servicing station and for transmitting the input signals to the first control device so as to enable remote control of the computer terminal via the servicing station.

According to still another aspect of the invention, an apparatus enables communication between a computer terminal and a servicing station in a remote controlled system. The computer terminal includes a main unit, a first display monitor that forms a video signal path with the main unit, and a first input device that forms an input signal path with the main unit. The servicing station includes a second display monitor and a second input device operable so as to generate input signals. The apparatus comprises:

a first control device including: a first image processing unit adapted to be connected to the video signal path for capturing video signals provided by the main unit to the first display monitor; a first signal processing unit adapted to be connected to the input signal path for providing the input signals to the main unit, and a first signal transmission unit coupled to the first image processing unit and the first signal processing unit, the first signal transmission unit being capable of transmitting the video signals from the first image processing unit, and of providing the input signals to the first signal processing unit; and a second control device including: a second signal transmission unit capable of establishing a communications link with the first signal transmission unit, the second signal transmission unit receiving the video signals transmitted by the first signal transmission unit, and providing the input signals to the first signal transmission unit; a second image processing unit adapted to be connected to the second display monitor and coupled to the second signal transmission unit, the second image processing unit receiving the video signals from the second signal transmission unit and providing the video signals to the second display monitor so that images shown on the first display monitor can be shown by the second display monitor, and a second signal processing unit adapted to be connected to the second input device and coupled to the second signal transmission unit, the second signal processing unit receiving the input signals generated by the second input device, and providing the input signals to the second signal transmission unit for transmission to the first signal transmission unit so as to enable remote control of the computer terminal via the servicing station.

According to yet another aspect of the invention, a remote controlled system comprises:

a computer terminal;

a first control device connected to the computer terminal, the first control device including means for capturing video signals of the computer terminal, means for transmitting the video signals, and means for receiving input signals and for providing the input signals to the computer terminal;

a servicing station; and a second control device connected to the servicing station and capable of establishing a communications link with the first control device, the second control device including means for receiving the video signals transmitted by the first control device and for providing the video signals to the servicing station so that images shown on the computer terminal can be shown by the servicing station, and means for receiving the input signals from the servicing station and for transmitting the input signals to the first control device so as to enable remote control of the computer terminal via the servicing station.

According to a further aspect of the invention, a remote controlled system comprises:

a computer terminal including a main unit, a first display monitor that forms a video signal path with the main unit, and a first input device that forms an input signal path with the main unit;

a first control device including: a first image processing unit connected to the video signal path for capturing video signals provided by the main unit to the first display monitor; a first signal processing unit connected to the input signal path for providing input signals to the main unit; and a first signal transmission unit coupled to the first image processing unit and the first signal processing unit, the first signal transmission unit being capable of transmitting the video signals from the first image processing unit, and of providing the input signals to the first signal processing unit;

a servicing station including a second display monitor and a second input device operable so as to generate the input signals; and a second control device including: a second signal transmission unit capable of establishing a communications link with the first signal transmission unit, the second signal transmission unit receiving the video signals transmitted by the first signal transmission unit, and providing the input signals to the first signal transmission unit; a second image processing unit connected to the second display monitor and coupled to the second signal transmission unit, the second image processing unit receiving the video signals from the second signal transmission unit and providing the video signals to the second display monitor so that images shown on the first display monitor can be shown by the second display monitor; and a second signal processing unit connected to the second input device and coupled to the second signal transmission unit, the second signal processing unit receiving the input signals generated by the second input device, and providing the input signals to the second signal transmission unit for transmission to the first signal transmission unit so as to enable remote control of the computer terminal via the servicing station.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
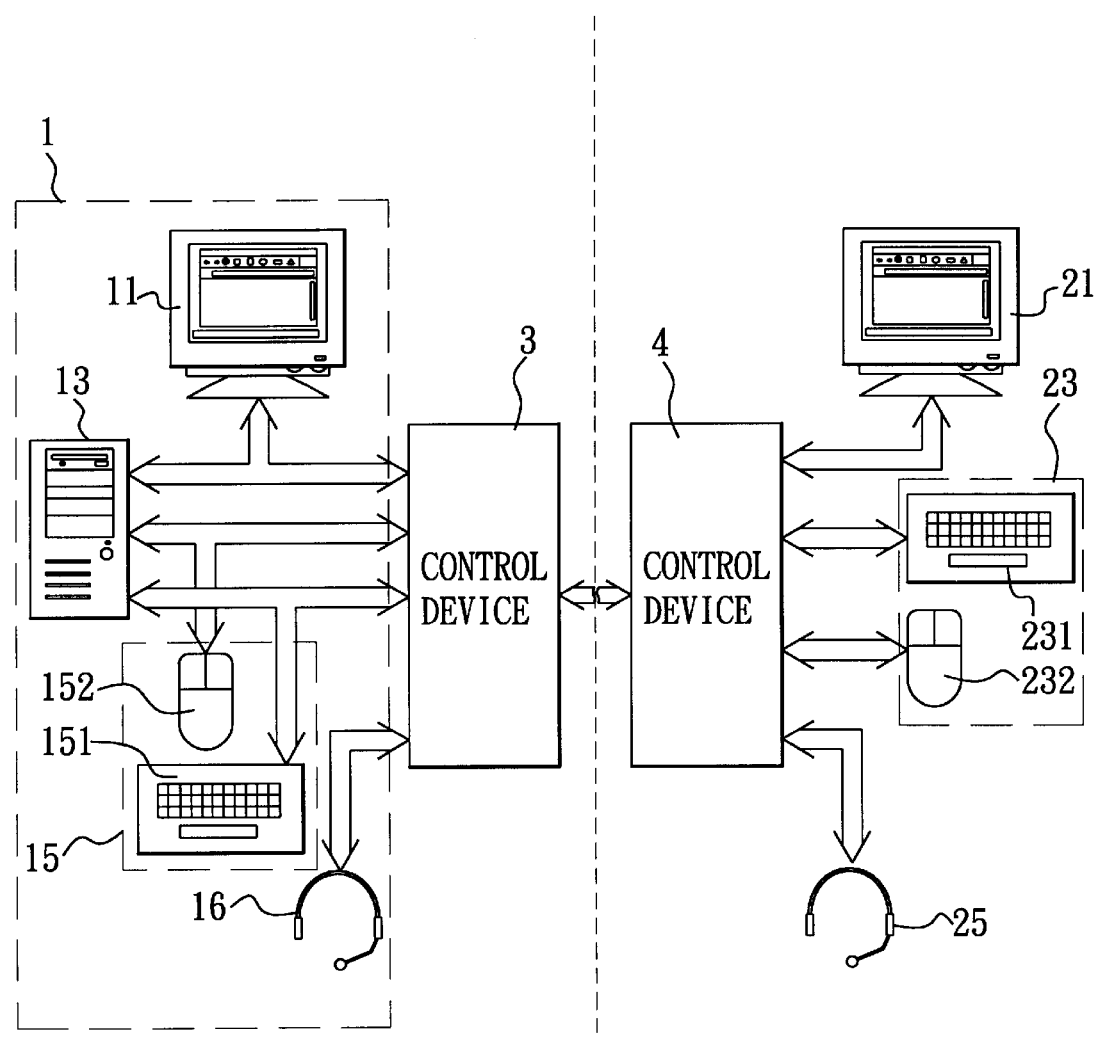
FIG. 1 is a schematic diagram illustrating a remote controlled system that incorporates the preferred embodiment of a communications apparatus according to the present invention.

Referring to FIG. 1, a computer terminal 1 and a servicing station 2 are connected respectively to first and second control devices 3, 4 to form a remote controlled system in accordance with this invention. A communications link, which may be a wired or a wireless communications link, is employed to couple the first and second control devices 3, 4. One example of a wired communications link is a modem adapted to connect with a network system. One example of a wireless communications link is a transmitter adapted to communicate with a satellite system. In the preferred embodiment, the communications link is established via a public switched telephone network.

The computer terminal 1, such as a user terminal, can be a desktop or notebook computer, and includes a first display monitor 11, a main unit 13, and a first input device 15. The first display monitor 11 can be a cathode ray tube or liquid crystal display monitor. The first input device 15 includes at least one of a keyboard 151 and a mouse 152.

The servicing station 2, which can be operated by technical personnel who are capable of solving problems encountered by the user of the computer terminal 1, includes a second display monitor 21 and a second input device 23. The second display monitor 21 can be a cathode ray tube or liquid crystal display monitor. The second input device 23 includes at least one of a keyboard 231 and a mouse 232.

Figure 2:
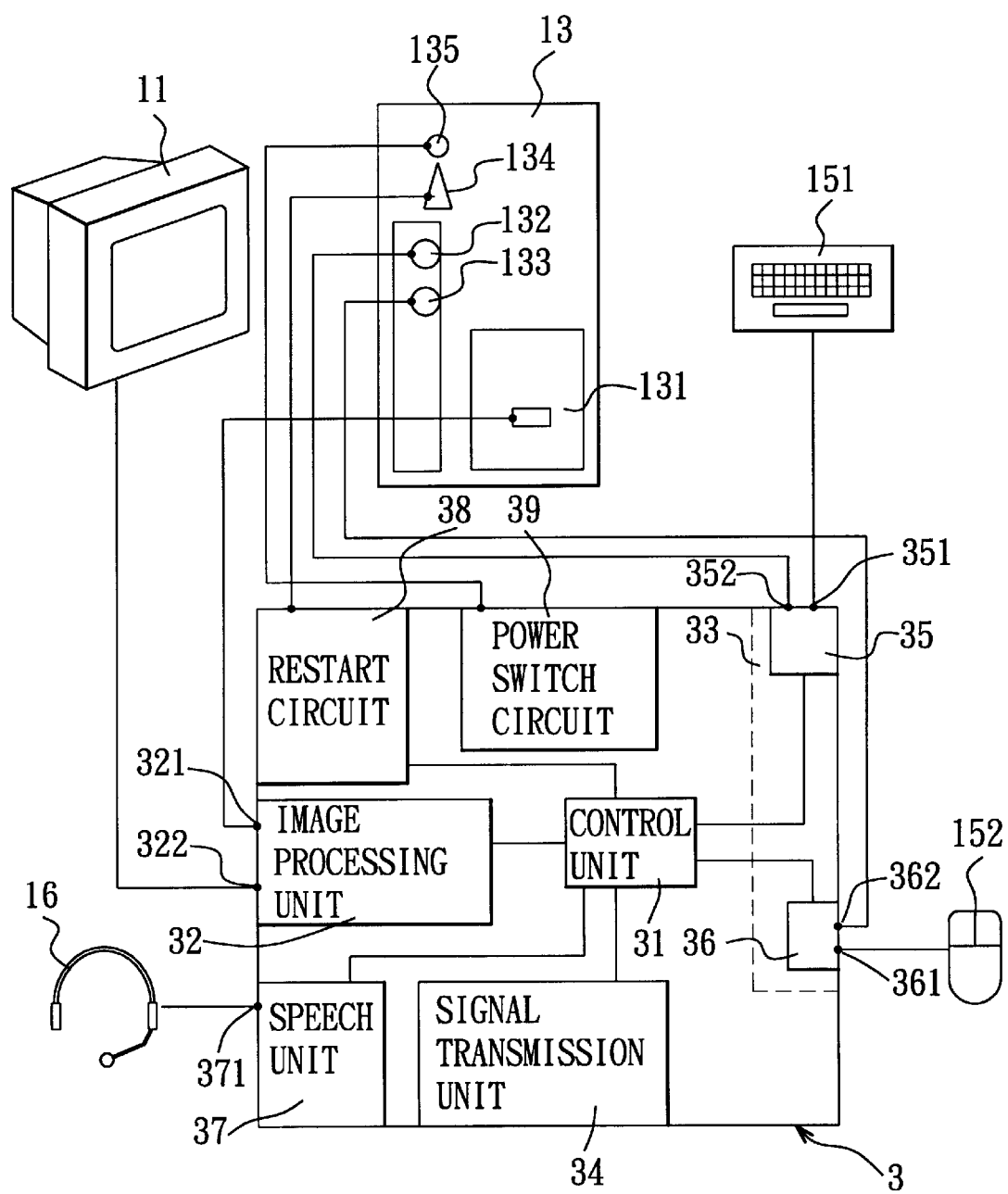
FIG. 2 is a schematic diagram illustrating the user side of the remote controlled system of FIG. 1 in greater detail.

Referring to FIG. 2, the first control device 3 is operable so as to capture video signals of the computer terminal 1 and to provide the video signals to the second control device 4. The first control device 3 is further operable so as to receive input signals from the second control device 4, and to provide the input signals to the main unit 13. The first control device 3 includes a first control unit 31, a first image processing unit 32, a first signal processing unit 33, and a first signal transmission unit 34.

The first control unit 31 is coupled to the first image processing unit 32, the first signal processing unit 33 and the first signal transmission unit 34, and controls signal transmission thereamong.

The first image processing unit 32 is connected to a video signal path formed between a display card 131 of the main unit 13 and the first display monitor 11, and is used to capture video signals transmitted by the display card 131 to the first display monitor 11, and to split the captured video signals into two identical sets. A first set of the video signals is processed by the first image processing unit 32. A second set of the video signals is sent to the first display monitor 11. In this embodiment, the first image processing unit 32 has an input 321 and an output 322. The input 321 is connected to the display card 131 of the main unit 13 via a signal cable so as to receive the video signals therefrom. The output 322 is connected to the first display monitor 11 via another signal cable so as to provide the second set of video signals thereto. Because the video signals from the display card 131 are generally in an analog format, the first image processing unit 32 preferably processes the first set of video signals by converting the same into a digital format. The first control unit 31 controls the transmission of the digital video signals from the first image processing unit 32 to the first signal transmission unit 34.

It should be apparent to one skilled in the art that it is not necessary for the first image processing unit 32 to split the video signals from the display card 131 into two identical sets. In case the first image processing unit 32 only has the input 321, a signal cable having one output connector and two input connectors is employed. The output connector of the signal cable is connected to the display card 131. One of the input connectors of the signal cable is connected to the first display monitor 11. The other one of the input connectors of the signal cable is connected to the input 321 of the first image processing unit 32. The effect of splitting the video signals from the display card 131 into two identical sets is thus achieved with the use of the aforesaid signal cable.

The first signal processing unit 33 is connected to an input signal path formed between the first input device 15 and the main unit 13, and allows input signals from the second control device 4 to be provided to the main unit 13. In this embodiment, the first signal processing unit 33 includes a first keyboard signal processing portion 35 and a first mouse signal processing portion 36. The first keyboard signal processing portion 35 has an input 351 and an output 352, and is coupled to the first control unit 31. The input 351 is connected to the keyboard 151 via a signal cable. The output 352 is connected to a keyboard port 132 of the main unit 13 via another signal cable. As such, input signals from the keyboard 151 and the second control device 4 can be provided to the keyboard port 132 of the main unit 13 via the first keyboard signal processing portion 35. In operation, the first keyboard signal processing portion 35 can be deemed equivalent to a three-port connector having a first input port (i.e. the input 351), a second input port (i.e. the connection with the first control unit 31), and an output port (i.e. the output 352), wherein either one of the input ports can transmit input signals to the keyboard port 132 of the main unit 13 via the output 352. Similarly, the first mouse signal processing portion 36 has an input 361 and an output 362, and is coupled to the first control unit 31. The input 361 is connected to the mouse 152 via a signal cable. The output 362 is connected to a mouse port 133 of the main unit 13 via another signal cable. As such, input signals from the mouse 152 and the second control device 4 can be provided to the mouse port 133 of the main unit 13 via the first mouse signal processing portion 36. In operation, the first mouse signal processing portion 36 can also be deemed equivalent to a three-port connector having a first input port (i.e. the input 361), a second input port (i.e. the connection with the first control unit 31), and an output port (i.e. the output 362), wherein either one of the input ports can transmit input signals to the mouse port 133 of the main unit 13 via the output 362.

As mentioned beforehand, the first signal transmission unit 34 is coupled to the first control unit 31 so that the operation thereof can be controlled by the latter. In the preferred embodiment, the first signal transmission unit 34 is a data communication equipment, such as a modem. The first signal transmission unit 34 receives the digital video signals generated by the first image processing unit 32, and converts the same into an analog format suitable for transmission to the second control device 4. The first signal transmission unit 34 further receives the input signals from the second control device 4, and converts the same into an appropriate signal format for reception by the first signal processing unit 33. Preferably, the first signal transmission unit 34 has a dial-up number, which is used for connecting with the second control device 4, previously stored therein. The first control device 3 can be additionally provided with a dial-up key. Upon detection by the first control unit 31 that the dial-up key was operated, the first control unit 31 enables the first signal transmission unit 34 to automatically initiate a dial-up connection with the second control device 4 using the dial-up number pre-stored therein. Of course, dial-up connection between the first and second control devices 3, 4 can also be established using known software control methods other than that described hereinabove.

Figure 3:
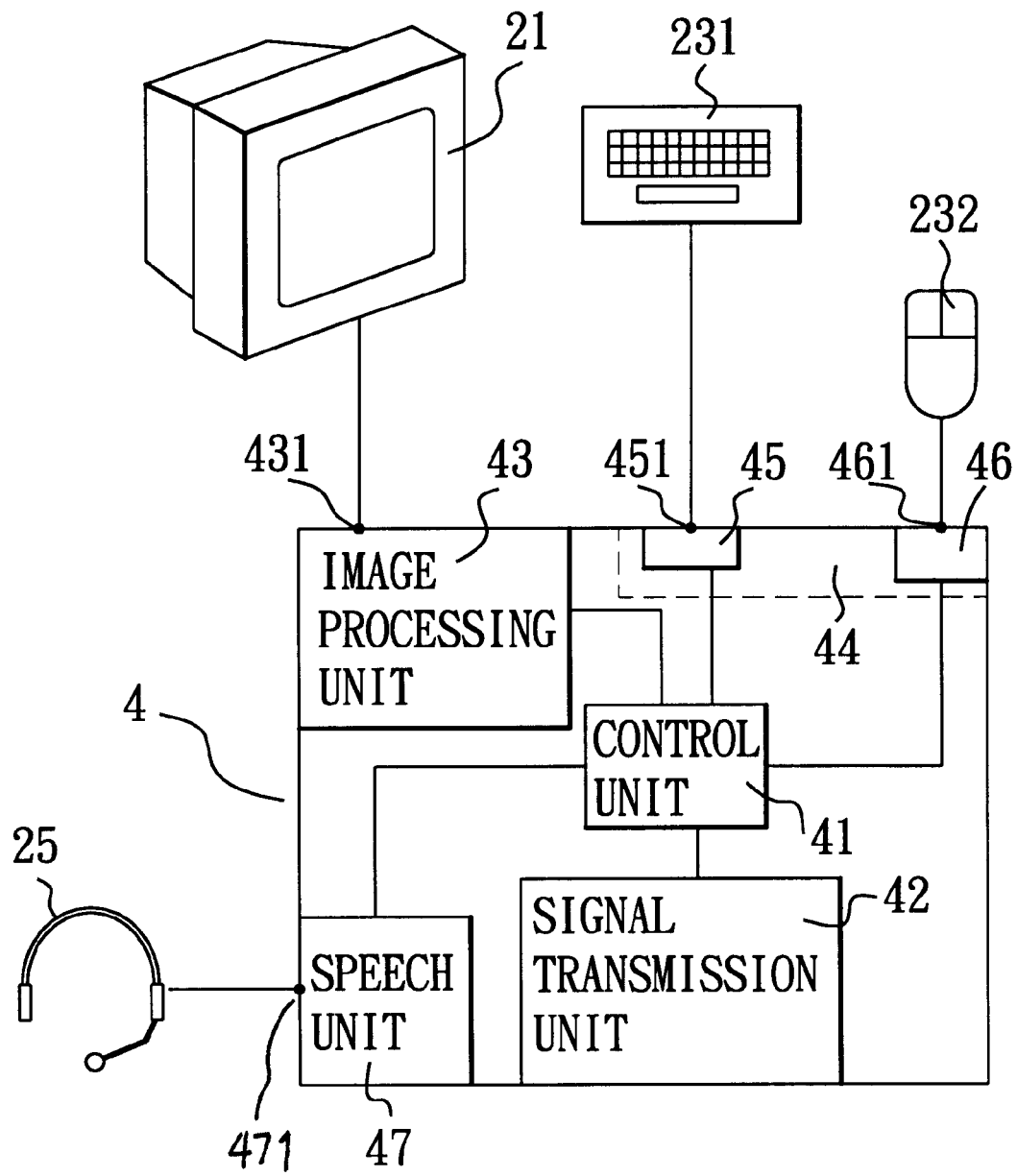
FIG. 3 is a schematic diagram illustrating the servicing side of the remote controlled system of FIG. 1 in greater detail.

Referring to FIG. 3, the second control device 4 is operable so as to receive the video signals transmitted by the first control device 3, and so as to provide the input signals to the first control device 3. The second control device 4 includes a second control unit 41, a second signal transmission unit 42, a second image processing unit 43, and a second signal processing unit 44.

The second control unit 41 is coupled to the second signal transmission unit 42, the second image processing unit 43, and the second signal processing unit 44, and controls signal transmission thereamong.

Like the first signal transmission unit 34 of the first control device 3, the second signal transmission unit 42 is a data communication equipment, such as a modem. The second signal transmission unit 42 receives the video signals transmitted by the first signal transmission unit 34, and converts the same into a digital format for reception by the second image processing unit 43.

The second image processing unit 43 has an output 431 that is connected to the second display monitor 21 of the servicing station 2 via a signal cable. The second image processing unit 43 receives the digital video signals from the second signal transmission unit 42 via the second control unit 41, and converts the same into an analog format suitable for reception by the second display monitor 21. As such, the image shown on the first display monitor 11 can be viewed simultaneously at the second display monitor 21.

The second signal processing unit 44 is connected to the second input device 23 of the servicing station 2, and provides input signals from the second input device 23 to the second signal transmission unit 42 via the second control unit 41. In this way, the second signal transmission unit 42 can convert the input signals into an analog format suitable for reception by the first signal transmission unit 34 of the first control device 3. In this embodiment, the second signal processing unit 44 includes a second keyboard signal processing portion 45 and a second mouse signal processing portion 46. The second keyboard signal processing portion 45 is coupled to the second control unit 41, and has an input 451 connected to the keyboard 231 of the second input device 23 via a signal cable. The input signals from the keyboard 231 can thus be provided to the second signal transmission unit 42 via the second keyboard signal processing portion 45 and the second control unit 41 for conversion and eventual transmission to the first signal transmission unit 34 of the first control device 3. Upon receipt of the input signals, the first signal transmission unit 34 converts the same into a digital format and provides the digital input signals to the first keyboard signal processing portion 35 via the first control unit 31 for eventual reception by the main unit 13 of the computer terminal 1 in the manner described beforehand. Similarly, the second mouse signal processing portion 46 is coupled to the second control unit 41, and has an input 461 connected to the mouse 232 of the second input device 23 via a signal cable. The input signals from the mouse 232 can thus be provided to the second signal transmission unit 42 via the second mouse signal processing portion 46 and the second control unit 41 for conversion and eventual transmission to the first signal transmission unit 34 of the first control device 3. Upon receipt of the input signals, the first signal transmission unit 34 converts the same into a digital format and provides the digital input signals to the first mouse signal processing portion 36 via the first control unit 31 for eventual reception by the main unit 13 of the computer terminal 1 in the manner described beforehand.

Preferably, the first and second control devices 3, 4 respectively have image compression and image decompression capabilities. For example, the first image processing unit 32 can incorporate an image compression function, whereas the second image processing unit 43 can incorporate an image decompression function. Alternatively, the first and second image processing units 32, 43 can both have image compression and decompression functions. Since the video signals transmitted from the first control device 3 to the second control device 4 are compressed video signals, the amount of video data to be transmitted can be reduced to reduce the data transmission time accordingly, thereby enhancing the ability to display the same images on the first and second display monitors 11, 21 at substantially the same time.

Preferably, the second keyboard signal processing portion 45 incorporates an encoder for encoding input signals from the keyboard 231, whereas the first keyboard signal processing portion 35 incorporates a decoder for decoding the input signals received from the second control device 4 via the first signal transmission unit 34. In this way, the amount of keyboard data to be transmitted can be reduced to reduce the data transmission time accordingly and thereby enhance the ability to control the computer terminal 1 remotely in real-time.

In operation, when there is an intent at the user side to request for technical assistance from the servicing side, the first control device 3 is activated (via key or software control) to establish connection with the second control device 4, which is preferably maintained in an active state. After connection is established between the first signal transmission unit 34 and the second signal transmission unit 42 under the control of the first control unit 31, the first control unit 31 enables the transmission of video signals from the first image processing unit 32 to the first signal transmission unit 34. Thereafter, the first signal transmission unit 34 converts the video signals received thereby into an analog format, and transmits the converted video signals to the second signal transmission unit 42. The second signal transmission unit 42 converts the video signals received thereby back into a digital format, and provides the digital video signals to the second image processing unit 43 under the control of the second control unit 41. After processing, the second image processing unit 43 provides the video signals to the second display monitor 21 so that images corresponding to those shown on the first display monitor 11 are simultaneously shown on the second display monitor 21. In response to the images shown on the second display monitor 21, technical personnel at the servicing side can operate the second input device 23 for remote control operation of the computer terminal 1. After the input signals from the keyboard 231 or the mouse 232 are processed by the respective one of the second keyboard signal processing portion 45 and the second mouse signal processing portion 46, the input signals are provided to the second signal transmission unit 42 under the control of the second control unit 41. The second signal transmission unit 42 converts the input signals received thereby into an analog format, and transmits the converted input signals to the first signal transmission unit 34. The first signal transmission unit 34 converts the input signals back into a digital format and, under the control of the first control unit 31, provides the input signals to an appropriate one of the first keyboard signal processing portion 35 and the first mouse signal processing portion 36. Thereafter, the main unit 13 of the computer terminal 1 receives the input signals from the first keyboard signal processing portion 35 when the input signals are keyboard signals, and from the first mouse signal processing portion 36 when the input signals are mouse signals. The computer terminal 1 can thus be controlled by the servicing station 2 to remedy the problem encountered by the user of the computer terminal 1.

Because the keyboard 151 and the mouse 152 of the first input device 15 remain connected to the main unit 13 of the computer terminal 1 via the first keyboard signal processing portion 35 and the first mouse signal processing portion 36, the main unit 13 can be controlled by the first input device 15 and the servicing station 2 at the same time.

Preferably, in order to enable the user of the computer terminal 1 and the technical personnel operating the servicing station 2 to discuss the user's problem more thoroughly, the first control device 3 further includes a first speech unit 37 coupled to the first control unit 31 and to the first signal transmission unit 34 via a data bus (not shown), and the second control device 4 further includes a second speech unit 47 coupled to the second control unit 41 and to the second signal transmission unit 42 via a data bus (not shown). Each of the first and second speech units 37, 47 has an input 371, 471 adapted to be connected to an external headset 16, 25 with both sound pick-up and reproduction capabilities. As such, outgoing speech signals picked up by the headset 16 are processed by the first speech unit 37 and are provided to the first signal transmission unit 34 under the control of the first control unit 31 for conversion into an analog format and for eventual transmission to the second signal transmission unit 42 of the second control device 4. The second signal transmission unit 42 provides the outgoing speech signals received from the first control device 3 to the second speech unit 47 under the control of the second control unit 41. In turn, the second speech unit 47 provides the outgoing speech signals to the headset 25 for reproduction. Accordingly, incoming speech signals picked up by the headset 25 are processed by the second speech unit 47 and are provided to the second signal transmission unit 42 under the control of the second control unit 41 for conversion into an analog format and for eventual transmission to the first signal transmission unit 34 of the first control device 3. The first signal transmission unit 34 provides the incoming speech signals received from the second control device 4 to the first speech unit 37 under the control of the first control unit 31. In turn, the first speech unit 37 provides the incoming speech signals to the headset 16 for reproduction. Therefore, the user of the computer terminal 1 and the technical personnel operating the servicing station 2 can converse with each other via the present invention so that operation of the first input device 15 by the user of the computer terminal 1 can be done under the guidance of the technical personnel.

As mentioned beforehand, errors in the hardware settings, such as the BIOS settings, might be the root of the problem encountered by the user of the computer terminal 1 when installing new software. This would require restarting of the computer terminal 1 when the present invention is in use. To enable the technical personnel operating the servicing station 2 to restart the computer terminal 1, the first control device 3 further includes a restart circuit 38 coupled to the first control unit 31 and adapted to be connected to a restart switch 134 of the main unit 13 of the computer terminal 1. The restart circuit 38 is activated by the first control unit 31 to enable the restart switch 134 and thus restart the main unit 13 of the computer terminal 1. The second control unit 41 of the second control device 4 is adapted to receive a first trigger signal, such as one that is generated when a hot key on the keyboard 231 of the second input device 23 is operated or one that is generated by a dedicated trigger key on the second control device 4. Upon detection of the first trigger signal, the second control unit 41 generates a restart signal that is received and transmitted by the second signal transmission unit 42. The first control unit 31 can thus receive the restart signal via the second and first signal transmission units 42, 34, and activates the restart circuit 38 accordingly.

Moreover, it is desirable to allow the servicing station 2 to turn off the computer terminal 1 when servicing is completed for power saving purposes. To this end, the first control device 3 further includes a power switch circuit 39 coupled to the first control unit 31 and adapted to be connected to a power circuit 135 of the main unit 13 of the computer terminal 1. The power switch circuit 39 is activated by the first control unit 31 to enable or disable the power circuit 135 and thus turn on or turn off the main unit 13 of the computer terminal 1. The second control unit 41 of the second control device 4 is adapted to receive a second trigger signal, such as one that is generated when a hot key on the keyboard 231 of the second input device 23 is operated or one that is generated by a dedicated trigger key on the second control device 4. Upon detection of the second trigger signal, the second control unit 41 generates a power control signal that is received and transmitted by the second signal transmission unit 42. The first control unit 31 can thus receive the power control signal via the second and first signal transmission units 42, 34, and activates the power switch circuit 39 accordingly.

It should be noted that remote control of the power of the computer terminal 1 is possible because the computer terminal 1 and the first control device 3 have separate power supplies. Furthermore, the first and second control units 31, 41 are capable of distinguishing the various signals received thereby from the first and second signal transmission units 34, 42 so that the signals can be routed accordingly.

The first and second control devices 3, 4 are preferably provided with their respective housings. The first and second control devices 3, 4 can be configured to fit into a space allocated for a hard disk drive in a computer. Alternatively, the first and second control devices 3, 4 can be configured as computer plug-in cards to facilitate installation. Moreover, the first and second control devices 3, 4 can be modified so that, instead of using signal cables, wireless connection can be established with the various components of the computer terminal 1 and the servicing station 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A remote controlled system comprising:
   a computer terminal including a main unit, a first display monitor that forms a video signal path with said main unit, and a first input device that forms an input signal path with said main unit;
   a first control device adapted to be connected to and operated independently from the computer terminal, including
      a first image processing unit connected to said video signal path for capturing video signals provided by said main unit to said first display monitor,
      a first signal processing unit connected to said input signal path for providing input signals to said main unit, and
      a first signal transmission unit coupled to said first image processing unit and said first signal processing unit, said first signal transmission unit being capable of transmitting the video signals from said first image processing unit, and of providing the input signals to said first signal processing unit;
   a servicing station including a second display monitor and a second input device operable to as to generate the input signals; and
   a second control device including
      a second signal transmission unit capable of establishing a communications link with said first signal transmission unit, said second signal transmission unit receiving the video signals transmitted by said first signal transmission unit, and providing the input signals to said first signal transmission unit,
      a second image processing unit connected to said second display monitor and coupled to said second signal transmission unit, said second image processing unit receiving the video signals from said second signal transmission unit and providing the video signals to said second display monitor so that images shown on said first display monitor can be shown by said second display monitor, and
      a second signal processing unit connected to said second input device and coupled to said second signal transmission unit, said second signal processing unit receiving the input signals generated by said second input device, and providing the input signals to said second signal transmission unit for transmission to said first signal transmission unit so as to enable remote control of said computer terminal via said servicing station.

2. The remote controlled system of claim 1, wherein each of said first and second input devices includes a keyboard, and each of said first and second signal processing units includes a keyboard signal processing portion.

3. The remote controlled system of claim 2, wherein:

said keyboard signal processing portion of said second signal processing unit includes an encoder for encoding the input signals from said keyboard of said second input device prior to transmission by said second signal processing unit; and said keyboard signal processing portion of said first signal processing unit includes an decoder for decoding the input signals provided thereto by said first signal transmission unit, and for providing the decoded input signals to said main unit.

4. The remote controlled system of claim 1, wherein each of said first and second input devices includes a mouse, and each of said first and second signal processing units includes a mouse signal processing portion.

5. The remote controlled system of claim 1, further comprising first and second units capable of sound pick-up and reproduction, said first control device being connected to said first unit, said first signal transmission unit receiving outgoing speech signals from said first unit and transmitting the outgoing speech signals, said first signal transmission unit further receiving incoming speech signals and providing the incoming speech signals to said first unit for sound reproduction, and said second control device being connected to said second unit, said second signal transmission unit receiving the incoming speech signals from said second unit and transmitting the incoming speech signals to said first signal transmission unit, said second signal transmission unit further receiving the outgoing speech signals from said first signal transmission unit and providing the outgoing speech signals to said second unit for sound reproduction.

6. The remote controlled system of claim 1, wherein each of said first and second signal transmission units includes a modem for establishing the communications link therebetween.

7. The remote controlled system of claim 1, wherein the second control device is adapted to be connected to and operated independently from the servicing station.

8. An apparatus for enabling communication between a computer terminal and a servicing station in a remote controlled system, said apparatus comprising:

a first control device adapted to be connected to and operated independently from the computer terminal, said first control device including means for capturing video signals of the computer terminal, means for transmitting the video signals, and means for receiving input signals and for providing the input signals to the computer terminal; and a second control device adapted to be connected to the servicing station and capable of establishing a communications link with said first control device, said second control device including means for receiving the video signals transmitted by said first control device and for providing the video signals to the servicing station so that images shown on the computer terminal can be shown by the servicing station, and means for receiving the input signals from the servicing station and for transmitting the input signals to said first control device so as to enable remote control of the computer terminal via the servicing station.

9. The apparatus of claim 8, the computer terminal and the servicing station respectively including first and second units capable of sound pick-up and reproduction, wherein:

said first control device further includes means for receiving outgoing speech signals from the first unit and for transmitting the outgoing speech signals, and means for receiving incoming speech signals and for providing the incoming speech signals to the first unit for sound reproduction; and said second control device further includes means for receiving the incoming speech signals from the second unit and for transmitting the incoming speech signals to said first control device, and means for receiving the outgoing speech signals from said first control device and for providing the outgoing speech signals to the second unit for sound reproduction.

10. The apparatus of claim 8, wherein:

said second control device further includes means for generating a restart signal and for transmitting the restart signal; and said first control device further includes means for receiving the restart signal from said second control device and for restarting the computer terminal upon receipt of the restart signal.

11. The apparatus of claim 8, wherein:

said second control device further includes means for generating a power control signal and for transmitting the power control signal; and said first control device further includes means for receiving the power control signal from said second control device and for turning on or turning off the computer terminal in accordance with the power control signal and a power supply separate from a main power supply for said computer terminal.

12. The apparatus of claim 8, wherein each of said first and second control devices includes a modem for establishing the communications link therebetween.

13. The apparatus of claim 8, wherein:

said first control device further includes means for compressing the video signals prior to transmission; and said second control device further includes means for decompressing the video signals transmitted by said first control device before providing the video signals to the servicing station.

14. The apparatus of claim 8, wherein the second control device is adapted to be operated independently from the servicing station.

15. An apparatus for enabling communication between a computer terminal and a servicing station in a remote controlled system, the computer terminal including a main unit, a first display monitor that forms a video signal path with the main unit, and a first input device that forms an input signal path with the main unit, the servicing station including a second display monitor and a second input device operable so as to generate input signals, said apparatus comprising:

a first control device adapted to be connected to and operated independently from the computer terminal, including a first image processing unit adapted to be connected to the video signal path for capturing video signals provided by the main unit to the first display monitor, a first signal processing unit adapted to be connected to the input signal path for providing the input signals to the main unit, and a first signal transmission unit coupled to said first image processing unit and said first signal processing unit, said first signal transmission unit being capable of transmitting the video signals from said first image processing unit, and of providing the input signals to said first signal processing unit; and a second control device including
- a second signal transmission unit capable of establishing a communications link with said first signal transmission unit, said second signal transmission unit receiving the video signals transmitted by said first signal transmission unit, and providing the input signals to said first signal transmission unit,
- a second image processing unit adapted to be connected to the second display monitor and coupled to said second signal transmission unit, said second image processing unit receiving the video signals from said second signal transmission unit and providing the video signals to the second display monitor so that images shown on the first display monitor can be shown by the second display monitor, and
- a second signal processing unit adapted to be connected to the second input device and coupled to said second signal transmission unit, said second signal processing unit receiving the input signals generated by the second input device, and providing the input signals to said second signal transmission unit for transmission to said first signal transmission unit so as to enable remote control of the computer terminal via the servicing station.

16. The apparatus of claim 15, wherein said second signal processing unit includes an encoder for encoding the input signals from the second input device prior to transmission by said second signal processing unit, and said first signal processing unit includes a decoder for decoding the input signals provided thereto by said first signal transmission unit, and for providing the decoded input signals to the main unit.

17. The apparatus of claim 15, the computer terminal and the servicing station respectively including first and second units capable of sound pick-up and reproduction, wherein:

said first control device is adapted to be connected to the first unit, said first signal transmission unit receiving outgoing speech signals from the first unit and transmitting the outgoing speech signals, said first signal transmission unit further receiving incoming speech signals and providing the incoming speech signals to the first unit for sound reproduction; and said second control device is adapted to be connected to the second unit, said second signal transmission unit receiving the incoming speech signals from the second unit and transmitting the incoming speech signals to said first signal transmission unit, said second signal transmission unit further receiving the outgoing speech signals from said first signal transmission unit and providing the outgoing speech signals to the second unit for sound reproduction.

18. The apparatus of claim 15, wherein each of said first and second signal transmission units includes a modem for establishing the communications link therebetween.

19. The apparatus of claim 15, wherein the second control device is adapted to be connected to and operated independently from the servicing station.

20. A remote controlled system comprising:

a computer terminal;

a first control device connected to and operably independently from said computer terminal, said first control device including means for capturing video signals of said computer terminal, means for transmitting the video signals, and means for receiving input signals and for providing the input signals to said computer terminal;

a servicing station; and a second control device connected to said servicing station and capable of establishing a communications link with said first control device, said second control device including means for receiving the video signals transmitted by said first control device and for providing the video signals to said servicing station so that images shown on said computer terminal can be shown by said servicing station, and means for receiving the input signals from said servicing station and for transmitting the input signals to said first control device so as to enable remote control of said computer terminal via said servicing station.

21. The remote controlled system of claim 20, further comprising first and second units capable of sound pick-up and reproduction, said first control device being connected to said first unit and further including means for receiving outgoing speech signals from said first unit and for transmitting the outgoing speech signals, and means for receiving incoming speech signals and for providing the incoming speech signals to said first unit for sound reproduction, and said second control device being connected to said second unit and further including means for receiving the incoming speech signals from said second unit and for transmitting the incoming speech signals to said first control device, and means for receiving the outgoing speech signals from said first control device and for providing the outgoing speech signals to said second unit for sound reproduction.

22. The remote controlled system of claim 20, wherein:

said second control device further includes means for generating a restart signal and for transmitting the restart signal; and said first control device further includes means for receiving the restart signal from said second control device and for restarting said computer terminal upon receipt of the restart signal.

23. The remote controlled system of claim 20, wherein:

said second control device further includes means for generating a power control signal and for transmitting the power control signal; and said first control device further includes means for receiving the power control signal from said second control device and for turning on or turning off said computer terminal in accordance with the power control signal and a power supply separate from a main power supply for said computer terminal.

24. The remote controlled system of claim 20, wherein said servicing station includes an input device that is operable so as to generate the input signals, said input device including at least one of a keyboard and a mouse.

25. The remote controlled system of claim 20, wherein each of said first and second control devices further includes a modem for establishing the communications link therebetween.

26. The remote controlled system of claim 20, wherein:

said first control device further includes means for compressing the video signals prior to transmission; and said second control device further includes means for decompressing the video signals transmitted by said first control device before providing the video signals to said servicing station.

27. The remote controlled system of claim 20, wherein the second control device is operated independently from the servicing station.

* * * * *